United States Patent [19]

Buschor et al.

[11] Patent Number: 4,489,749
[45] Date of Patent: Dec. 25, 1984

[54] PRESSURE REGULATING DEVICE FOR GASEOUS AND LIQUID FLUIDS

[75] Inventors: Karl Buschor; Hans Giesinger, both of St. Gall; Kurt Moos, Wil, all of Switzerland

[73] Assignee: Ransburg-Gema AG, Switzerland

[21] Appl. No.: 500,325

[22] Filed: Jun. 2, 1983

[30] Foreign Application Priority Data

Jun. 3, 1982 [DE] Fed. Rep. of Germany ....... 3220815

[51] Int. Cl.$^3$ ............................................. F16K 31/12
[52] U.S. Cl. .................................... 137/487.5; 251/29
[58] Field of Search .................. 137/85, 487.5; 251/29

[56] References Cited

U.S. PATENT DOCUMENTS

| 334,080 | 1/1886 | Mason | 137/488 |
|---|---|---|---|
| 1,155,076 | 9/1915 | Melcher | 137/488 |
| 1,389,370 | 8/1921 | Metzger | 137/488 |
| 4,261,509 | 4/1981 | Anders et al. | 137/487.5 |
| 4,346,732 | 8/1982 | Moos | 137/489 |

FOREIGN PATENT DOCUMENTS

| 895432 | 9/1953 | Fed. Rep. of Germany | 137/485 |
|---|---|---|---|
| 1277344 | 10/1960 | France | 137/485 |

Primary Examiner—Henry C. Yuen
Assistant Examiner—John Kwon
Attorney, Agent, or Firm—Ostrolenk, Faber, Gerb & Soffen

[57] ABSTRACT

A pressure regulating device for gaseous and liquid fluids contains a pressure regulator with an inlet and an outlet and a pressure space between them. The pressure in that space is regulated by a shiftable main valve. An actual pressure value chamber is connected with the pressure space. A set value or desired value chamber communicates through a diaphragm with the actual value chamber. The diaphragm is movable to move the valve body for adjusting the actual pressure in the pressure space to the desired pressure in the desired value chamber. An electromagnetic set-point adjuster adjusts the pressure in the desired value chamber. The adjuster includes a set-value transducer, with an actual value sensor which is exposed to the pressure in the pressure space, and the transducer produces an electric signal corresponding to that pressure. That signal is compared with a set-value signal for establishing a signal which controls the electromagnetic set-point adjuster to set the desired value for the pressure in the desired value chamber which, in turn, will set the pressure in the actual pressure value chamber and therefore the pressure in the pressure space.

12 Claims, 2 Drawing Figures

PRESSURE REGULATING DEVICE FOR GASEOUS AND LIQUID FLUIDS

BACKGROUND OF THE INVENTION

The present invention relates to a pressure regulating device for gaseous and liquid fluids. Such device has a pressure regulator with an inlet and an outlet for the fluid. A pressure space is arranged between the inlet and outlet and it is the pressure in that space which is to be regulated. A main valve determines the flow of fluid through the pressure space. An electromagnetic set point adjuster adjusts the actual pressure in the pressure space. There is an actual value pressure measurement chamber connected with the pressure space to be regulated. Finally, there is a set-value/actual-value comparison device which actuates the main valve as a function of the comparison between the desired pressure determined by the set point adjuster and the actual pressure of the actual value pressure measurement chamber.

One such pressure regulating device is known from German Patent Application DE-OS No. 28 49 265, corresponding to U.S. Pat. No. 4,346,732.

SUMMARY OF THE INVENTION

The present invention is directed at developing the pressure regulating device in such a manner that upon any changes of the desired pressure value and/or upon changes of the actual pressure value, the actual value is rapidly and accurately brought to the desired value. In this connection, influences which interfere with accuracy are to be avoided, as far as possible. At the same time, a compact, small construction of the pressure regulating device is to be obtained, without rapid response and accuracy being impaired.

According to the invention, a set-value transducer is provided. It has an actual-value sensor that is exposed to the pressure of the pressure space to be regulated and that produces an electrical actual-value signal which corresponds to the instantaneous pressure. A comparator compares the electrical actual signal with a set value established for it. A set-value signal, which is corrected in accordance with the comparison, is supplied by the comparator to the electromagnetic set point adjuster.

In this way, one has a combination of a fluid feedback and an electric feedback. The fluid feedback with the actual value measurement chamber responds to changes in pressure in the pressure space to be regulated and also to pressure changes of the set-value adjuster so that it rapidly adapts the actual pressure value to the desired pressure value. However, permanent control deviations result due to friction between the moving parts of the apparatus and mechanical stresses. These permanent control deviations are eliminated by the electric feedback established by the set-value transducer. Thus, to ssure that the actual pressure value in the pressure chamber is correct, the desired pressure value also is reset. The electric feedback, to be sure, does not respond as rapidly as the fluid feedback, but it gives an accurate adjustment of the desired pressure value since it is independent of friction between apparatus parts and independent of mechanical stresses in those parts. The pressure control device of the invention thus responds rapidly and corrects changes in a very short time. At the same time, it is free of hysteresis.

The purpose of the feedback adjustment is to selectively open and close the main valve. This controls the pressure in the pressure space. The electric feedback controls the level of the desired pressure, to which the pressure in the pressure space is accommodated. The electric feedback controls the electromagnetic set point adjuster for adjusting the desired pressure level. The chamber in which the desired pressure is to be established also communicates with the main fluid inlet and thus has fluid flowing into it. The outlet from that desired pressure chamber is closed off by a valve which is part of the electromagnetic set point adjuster and that valve operates in opposition to the pressure in the pressure setting chamber, whereby the pressure exerted by that valve to restrict exit from the setting chamber establishes the pressure in that chamber. The electric feedback adjusts that electromagnetic set point adjuster.

As in the above-described prior art unit, there is the shiftable diaphragm between the desired pressure chamber and the actual pressure value measurement chamber, and the shifting of the diaphragm, in its turn, controls the main valve which adjusts the pressure in the pressure space.

The actual value sensor which is part of the comparator is preferably a piezo-resistive piezo element which is supported so as to change its electric resistance as a function of the pressure in the pressure space. For example, is is permitted to have bending force applied to the element by the pressure change. The electrical resistance in the piezo-resistive piezo element changes as a function of the pressure in the pressure space. The piezo element is in an electric circuit with the comparator and provides the actual value measurement signal to the comparator, and the comparator, of course, has the preset value to compare the actual value with.

The electrical connection between the comparator and the set point adjuster includes a pulse width modulator for converting the analog signals from the comparator into pulse signals having a constant frequency but having pulse widths which vary as a function of changes in the analog signals. The pulse width signal controls the operation of the electromagnetic set point adjuster.

One embodiment of the invention will be described as example below with reference to the accompanying drawings.

DESCRIPTION OF A PREFERRED EMBODIMENT

Figure 1:
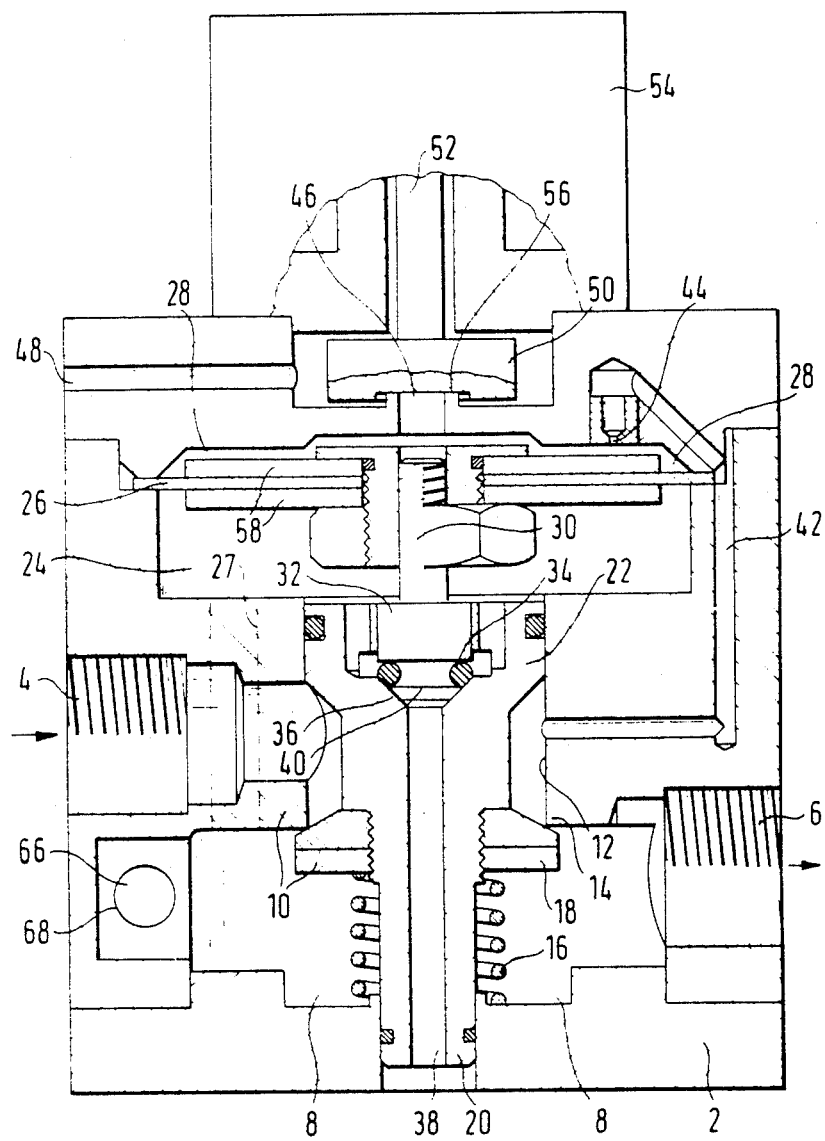
FIG. 1 is a diagrammatic longitudinal section through a pressure regulator of the pressure regulation device of the invention.
Figure 2:
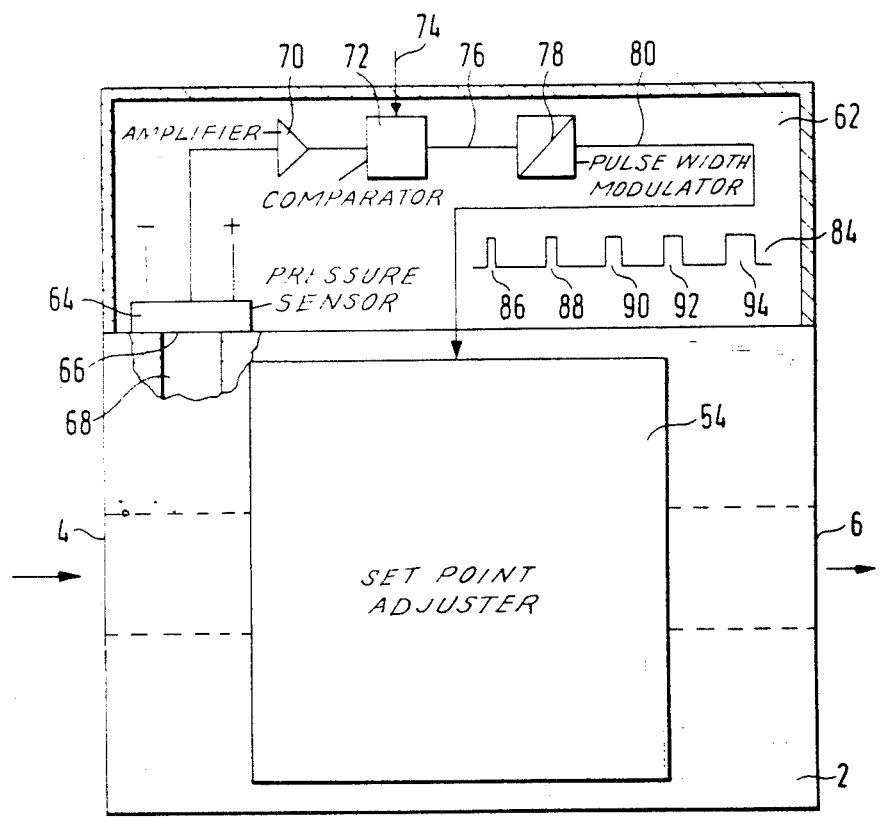
FIG. 2 is a top view, partially in section, of the pressure regulating device of the invention, the lower part of FIG. 2 showing the pressure regulator in top view and the upper part of FIG. 2 showing in cross-section a set-value transducer which forms a structural unit together with the pressure regulator.

The pressure control device is suitable in particular for gaseous fluids but can also be used for liquid fluids. As shown in FIG. 1, the device contains a pressure regulator 2. The regulator has an inlet 4 and an outlet 6 for the fluid, and has a pressure chamber 8 arranged between them. A main valve 10, which determines the flow of the fluid through the pressure chamber 8, serves as an actuator. The valve 10 is between the inlet 4 and the pressure space 8 which is to be regulated. The main valve 10 includes a valve seat 14 which is formed by a cylinder bore 12. The seat 14 cooperates with a valve body 18, which is urged into closed position against the seat by a coil compression spring 16. The valve body 18 is seated on a piston 20. The piston 20 has a widened piston section 22 which is guided for axial movement within the cylinder bore 12. The piston is axially displaceable in the cylinder bore 12. The piston also separates the part of the inlet 4, which leads to the valve seat 14, from an actual-value measurement chamber 24, preventing the chamber from being pressurized by the inlet. The actual-value measurement chamber 24 is connected to the pressure space 8 to be regulated by a borehole 27, shown in dashed line. The main valve 10 serves as the actuator for the adjustment of the fluid.

The actual-value measurement chamber 24 is separated by a diaphragm 26 from a desired pressure chamber 28 which is arranged above it. The diaphragm 26 is connected to the valve body 18 of the main valve 10 which is actuated by the diaphragm. The connection is through a ram 30 which is fastened in the center of the diaphragm 26. The downwardly directed head 32 of the ram rests against the piston 20 on which the valve body 18 is fastened.

Upon deflection of the diaphragm 26 in the downward direction, the piston 20 is moved downward by the ram 30 in opposition to the pressure of the spring 16. This lifts the valve body 18 of the main valve 10 from the valve seat 14 and moves the body 18 downward. Upon deflection of the diaphragm 26 in the upward direction, the ram head 32 is lifted off the piston 20. The ram head 32 forms a valve body with an annular packing 34 which is received in a valve seat 36 on the upper end of a vent conduit 38 passing through the piston 20, and all of this forms a vent valve 40. Through the vent valve 40 and the vent conduit 38, the actual-value measurement chamber 24 is vented whenever the diaphragm 26 moves the ram head 32 so far upward that the valve body 18 of the main valve 10 comes against the valve seat 14 and the ram head 32 is then lifted together with the annular packing 34 from the valve seat 36 of the vent valve 40.

The desired-pressure chamber 28 is connected via a conduit 42, which contains a flow throttle point 44, to the cylinder bore 12 and thus also to the inlet 4. Furthermore, the desired-pressure chamber 28 is connected via a pressure relief valve 46 with a flow discharge conduit 48. The pressure relief valve 46 has a valve body 50 which is pressed by a piston 52 of an electromagnetic set-point adjuster 54 against the valve seat 56 in opposition to the pressure prevailing in the desired-pressure chamber 28. The diaphragm 26 and the parts connected to it form a comparison device which actuates the main valve 10 as a function of the comparison between the desired pressure determined by the set-point adjuster 54 and the actual pressure of the actual-value measurement chamber 24.

The conduit formed by the bore 27 between the pressure space 8 to be regulated and the actual-value measurement chamber 24 may contain a flow throttle.

The pressure regulator responds very rapidly to changes in value, adaptation of the actual value to the set-value taking place very rapidly upon a change in the actual value or in the set-value. However, possibly disturbing permanent control deviations may be caused by the mechanical friction between the piston section 22 and the cylinder bore 12, and further due to flexural stresses of the diaphragm 26 and of the diaphragm plates which stiffen it on both sides of the diaphragm, as well as by the hysteresis of the electromagnetic set-point adjuster 54.

The pressure control device is preferably employed for controlling the pneumatic pressures of gases upon the pneumatic conveyance and atomization of powder-like coating material in spray-coating devices.

In addition to providing the rapid response, the invention avoids the above-mentioned control errors caused by friction, stresses and hysteresis by the set-value transducer described below, so that both a rapid and an error-free setting of the pressure regulator is obtained.

The set-value transducer 62 shown in FIG. 2 contains an actual-value sensor 64 which is arranged on the mouth 66 of a fluid conduit 68 which extends to the presssure space 8 to be regulated. The sensor 64 is thus directly subjected to the pressure prevailing in the pressure space 8. The actual-value sensor 64 supplies an electric actual signal, corresponding to the instantaneous pressure of the pressure space 8, via an amplifier 70, to an analog comparator 72. The comparator 72 compares the electrical actual signal of the actual-value sensor 64 with a desired value 74 established for it and produces on its output line 76 an analog corrected desired-value signal which is indicative of said comparison. In the preferred embodiment, the magnitude of the output of comparator 72 will vary as a function of the difference in magnitude of the electrical actual signal appearing at the output of amplifier 70 and the desired value 74. As such, the output of comparator 72 is an error signal indicative of the difference between the desired and actual pressure in space 8. This signal is applied to the electromagnetic set-point adjuster 54, preferably via pulse width modulator 78. As such, the adjuster 54 does not receive the desired value signal 74 directly but, rather, receives a desired value signal which has been corrected by the electric feedback via the actual-value sensor 64. The set-point adjuster 54 adjusts the position of the valve body 50 against the valve seat 56 of the pressure relief valve 46 as a function of the signal appearing at the output of comparator 72 so as to adjust the pressure in chamber 28.

The actual-value sensor 64 is preferably formed with a piezo-resistive piezo element which is exposed to the pressure of the pressure space to be controlled at the conduit mouth 66. The electrical resistance of that piezo element changes as a function of the pressure. The piezo element of the actual-value sensor 64 in known manner forms a part of a measurement bridge. A piezo-resistive piezo element sensor is preferred which gives accurate measurement signals and requires only a small amount of space.

If an analog signal, such as that appearing at the output of comparator 72, were directly applied to an electric load, such as the electromagnetic set-point adjuster 54, the load would continuously consume current and thus a large amount of energy. In order to save energy, the output line 76 of the comparator 72 is not connected directly to the set point adjuster 54 but rather to a pulse-width modulator 78. The output pulse signals generated by modulator 78 are fed via an output line 80 to the electromagnetic set-point adjuster 54. The pulse-width modulator 78 produces on its outlet line 80 pulse signals 84 of constant frequency but of pulse widths which vary as a function of the magnitude (or if desired, any other parameter) of the analog signal on line 76 of the comparator 72. The pulse signals 84 shown in FIG. 2 form a signal chain. The first two pulse signals 86 and 88 have a small pulse width corresponding to a small analog signal of the comparator 72. The following two pulse signals 90 and 92 have a larger pulse width corresponding to a larger analog signal of the comparator 72 on its output line 76. Another pulse signal 94 of the pulse-signal chain 84 has an even greater width corresponding to an even larger analog signal of the comparator 72. The wider the pulse signals, the greater the electromagnetic force with which the piston 52 of the set-point adjuster 54 presses the valve body 50 against the valve seat 56 of the pressure relief valve 46. A higher desired pressure can accordingly build up in the desired-pressure chamber 28. The use of pulse signals instead of analog signals for the set-point adjuster 54 results in a substantial saving of energy.

As shown in the drawings, the pressure regulator 2 and the set-value transducer 62 are combined to form a single structural unit. In this connection, the pressure regulator 2 and the set-value transducer 62 may either be two structural parts with separate housings fastened to each other, or the pressure regulator 2 and the set-value transducer 62 can together have a common housing. In this way, a number of advantages are obtained. There are short line connections which are not subject to disturbance by electrical leakage fields. Shorter response times and less overshooting of the control processes result in more favorable control behavior. Furthermore, the structural unit can be made compact and can be initially provided at the time of manufacture with all connections between the pressure regulator and the set-value transducer so that the structural unit has only a few connections to be made at the building site.

The electromagnetic set-point adjuster 54 contains an electromagnetic proportional magnet and therefore has a proportional response characteristic.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A pressure regulating device for gaseous and liquid fluids, including a housing with a pressure space, and the pressure in the pressure space is to be regulated; a fluid inlet to and an outlet from the pressure space; a main valve movable for cooperating with the housing for adjusting the flow of fluid through the pressure space and for thereby adjusting the pressure in the pressure space;

an actual pressure value measurement chamber connected to the pressure space;

an electromagnetic set-point adjuster which is adjustable for setting a desired pressure level;

a comparison device for comparing the actual pressure in the actual pressure value measurement chamber with the desired pressure set by the set-point adjuster; the comparison device being connected with the main valve for opening the main valve to increase the pressure in the pressure space when that pressure is below the desired pressure and for closing the valve to decrease the pressure in the pressure space when that pressure is above the desired pressure;

a set value transducer comprising an actual value sensor exposed to the pressure space, the transducer producing an actual value electric signal corresponding in value to the pressure then in the pressure space; a comparator for comparing the actual value signal with a predetermined set value and for supplying a set value signal, corrected due to the comparison, to the set-point adjuster which adjusts the desired pressure.

2. The pressure regulating device of claim 1, wherein the main valve is disposed between the fluid inlet and the pressure space.

3. The pressure regulating device of claim 1, wherein the comparison device comprises a desired pressure value chamber; a flexible diaphragm between the desired pressure value chamber and the actual value measurement chamber, whereby the diaphragm flexes as the pressure differential between the two chambers varies; the diaphragm being connected with the main valve body for moving the main valve body as the diaphragm is moved.

4. The pressure regulating device of claim 3, wherein the desired pressure value chamber is connected to the inlet; a fluid discharge conduit from the desired pressure chamber; a pressure relief valve in the fluid discharge conduit, including a second valve body which selectively controls discharge of fluid from the desired pressure chamber dependent upon the pressure exerted on the second valve body; the set-point adjuster being connected with the second valve body for acting on the second valve body for driving it to close off the fluid discharge conduit in opposition to the pressure in the desired pressure chamber.

5. The pressure regulating device of claim 4, further comprising a throttle between the desired pressure chamber and the inlet.

6. The pressure regulating device of claim 1, wherein the comparison device comprises a pressure chamber; means between the desired pressure chamber and the actual value measurement chamber for shifting as the pressure differential between the two chambers varies; the shifting means being connected with the main valve body for moving the main valve body as the shifting means is moved.

7. The pressure regulating device of claim 6, wherein the desired pressure chamber is connected to the inlet; a fluid discharge conduit from the desired pressure chamber; a pressure relief valve in the fluid discharge conduit, including a second valve body which selectively controls discharge of fluid from the desired pressure chamber dependent upon the pressure exerted on the second valve body; the set-point adjuster being connected with the second valve body for acting on the second valve body for driving it to close off the fluid discharge conduit in opposition to the pressure in the desired pressure chamber.

8. The pressure regulating device of claim 7, wherein the actual value sensor comprises a piezo-resistive piezo element exposed to the pressure in the pressure space, and the piezo element is supported for changing its electrical resistance as a function of the pressure in the pressure space.

9. The pressure regulating device of claim 1, wherein the actual value sensor comprises a piezo-resistive piezo element exposed to the pressure in the pressure space, and the piezo element is supported for changing its electrical resistance as a function of the pressure in the pressure space.

10. The pressure regulating device of claim 1, further comprising an electrical connection between the comparator and the set-point adjuster, and including a pulse-width modulator for converting analog signals from the comparator into pulse signals which vary as a function of changes in the analog signals.

11. The pressure regulating device of claim 10, wherein the pulse width modulator converts the analog signals from the comparator into pulse signals with a constant frequency but with pulse widths which vary as a function of the changes in the analog signals.

12. The pressure regulating device of claim 1, wherein the housing and the set-value transducer are all combined into a single structural unit.

* * * * *